United States Patent [19]
Bowen

[11] Patent Number: 5,381,840
[45] Date of Patent: Jan. 17, 1995

[54] STUMP-GRINDING APPARATUS

[76] Inventor: Randal G. Bowen, 1503 Caddo School Rd., Joshua, Tex. 76058

[21] Appl. No.: 110,640

[22] Filed: Aug. 20, 1993

Related U.S. Application Data

[63] Continuation-in-part of Ser. No. 941,516, Sep. 8, 1992, Pat. No. 5,269,355.

[51] Int. Cl.6 .................... A01G 23/06; B27C 9/00
[52] U.S. Cl. .................... 144/2 N; 144/231; 144/235; 144/218; 144/241; 407/102
[58] Field of Search ............ 144/2 N, 162 R, 176, 144/218, 224, 225, 223, 228, 229, 230, 231, 241; 407/33, 102, 103

[56] References Cited

U.S. PATENT DOCUMENTS

| | | | |
|---|---|---|---|
| 1,405,614 | 2/1922 | Mitchell | 144/231 |
| 3,331,561 | 7/1967 | Morkoski et al. | 144/224 |
| 3,570,566 | 3/1977 | McCreery | 144/2 |
| 3,911,979 | 10/1975 | Rousseau | 144/2 N |
| 4,180,107 | 12/1979 | Grover | 144/2 N |
| 4,530,385 | 7/1985 | York | 144/2 N |
| 4,621,668 | 11/1986 | York | 144/3 K |
| 4,681,145 | 7/1987 | York | 144/2 N |
| 4,697,625 | 10/1987 | Bolton | 144/2 N |
| 4,703,786 | 11/1987 | Dockocil | 144/2 N |
| 4,757,848 | 7/1988 | Mollberg, Jr. | 144/2 N |
| 4,827,995 | 5/1989 | Wilson | 144/2 N |
| 4,848,423 | 7/1989 | Yoder | 144/2 |
| 4,960,157 | 10/1990 | Sheets | 144/34 |
| 4,974,649 | 12/1990 | Manning | 144/2 N |
| 5,034,407 | 7/1991 | Hooser | 144/2 |
| 5,115,845 | 5/1992 | Hooser | 144/2 |

OTHER PUBLICATIONS

Parts Lists & Drawing, Levco Mfrs., Inc., Wynne, AR. (date unknown).
Product Brochure, Stumpmaster Australia Pty. Ltd (date unknown).
Product Brochure, Promark (date unknown).

*Primary Examiner*—W. Donald Bray
*Attorney, Agent, or Firm*—Mark D. Perdue

[57] ABSTRACT

A stump-grinding apparatus includes a primer mover secured to a frame having a pair of wheels and a handle. A cutting wheel is secured to the prime mover for rotation. At least one cam member is coupled between the wheels and the frame and is operable from the handle to selectively adjust the height between the cutting wheel and the object to be disintegrated. A throttle member is also secured to the handle for selective control of the prime mover. The cutting wheel has a generally disk-shaped element having an outer diameter. At least one cutting tooth having a leading cutting edge and a generally opposite trailing cutting edge is secured to the outer diameter of the disk to define a selected angle between the leading cutting edge and a line parallel to the axis rotation of the cutting wheel. This angular offset permits the cutting wheel to cut a wider kerf, and to impart a slicing action in addition to the chipping action of the teeth.

10 Claims, 5 Drawing Sheets

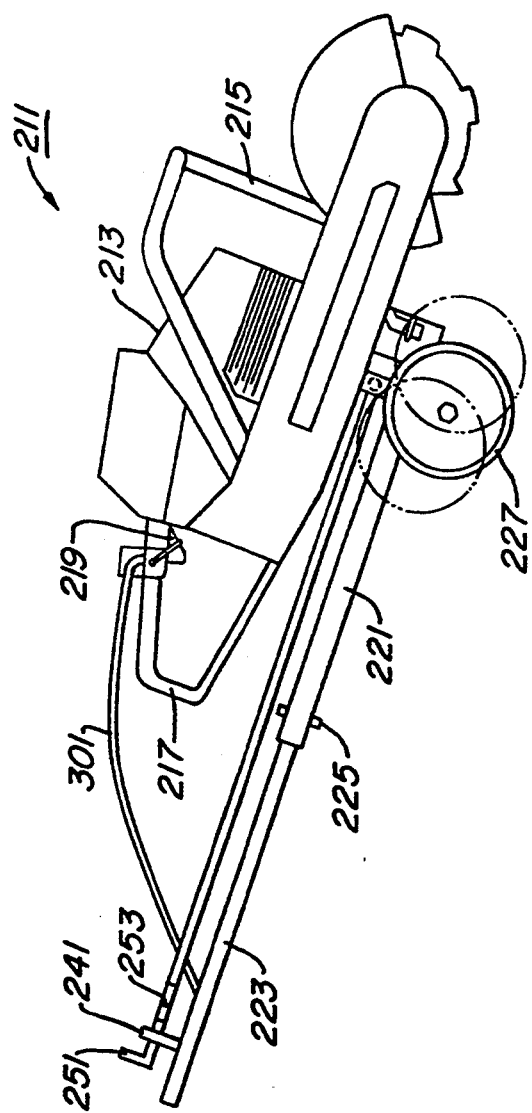
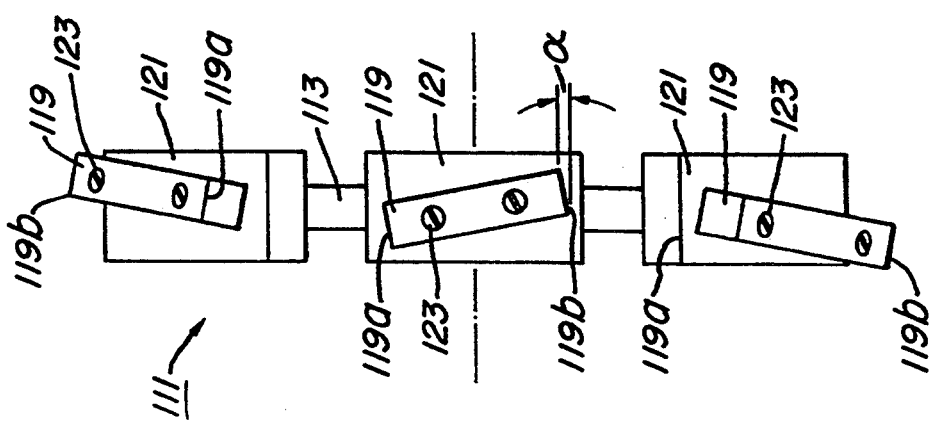
Fig. 6
Fig. 5

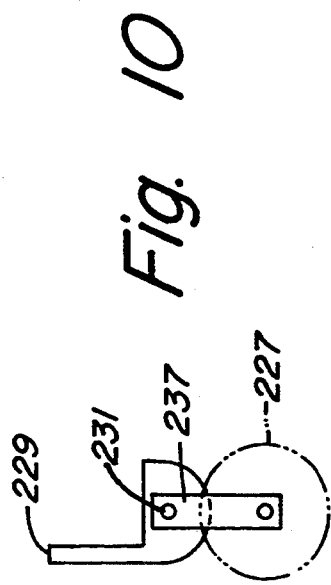
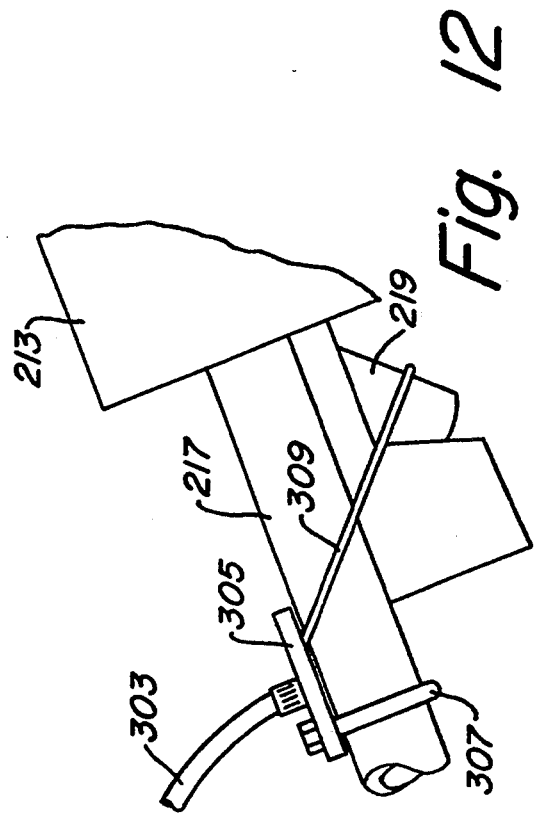
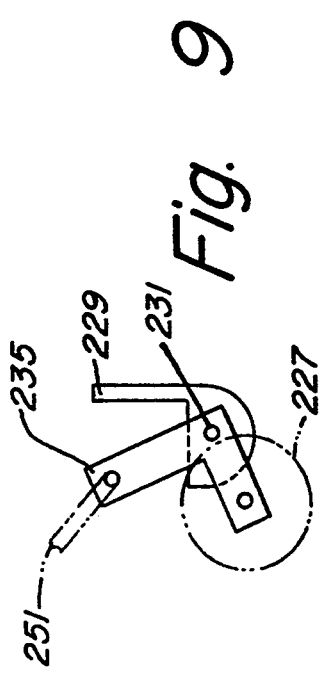
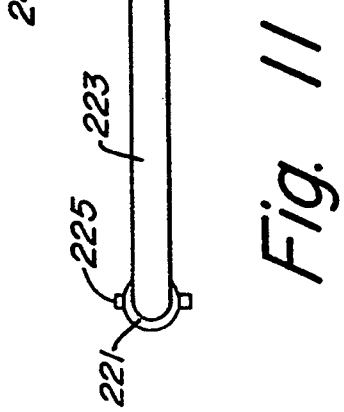

STUMP-GRINDING APPARATUS

CROSS REFERENCE TO RELATED APPLICATION

This application is a continuation-in-part of application Ser. No. 07/941,516 filed Sep. 8, 1992, U.S. Pat. No. 5,269,355.

BACKGROUND OF THE INVENTION

1. Field of the Invention

The present invention generally relates to apparatus for the grinding or disintegration of tree stumps.

2. Description of the Prior Art

Stump-grinding apparatus of varying configuration has been used for a number of years to grind and disintegrate unsightly stumps that remain after a tree is felled. Such conventional stump-grinding apparatus usually is provided with a power end, which supplies power to a cutting end, which actually disintegrates the stump. Prior-art stump-grinding apparatus may be of a handheld variety or of a walk-behind or stand-up variety.

Whether of the hand-held or walk-behind variety, conventional stump-grinding apparatus usually is provided with a cutting end comprising a shaft for rotation by the power end, and a cutting wheel having some form of cutting teeth, the cutting wheel secured to the shaft for rotation and disintegration of the stump. One prior-art hand-held stump-grinding apparatus, sold under the trade name "Grip 1000," has a cutting wheel having a plurality of fingers that extend radially from the center of the wheel and are provided at terminal ends thereof with carbide or hardmetal tips. Such a cutting wheel cuts in only one direction of rotation and cuts a relatively narrow kerf in the stump, wherein disintegration of the stump becomes time-consuming and expensive because only a relatively small volume of stump material is removed per revolution of the wheel. Additionally, a hand-held stump grinder necessarily requires the operator to kneel, stoop, or otherwise arrange himself near the grinding operation, increasing operator fatigue and exposure to injury from flying chips or even the cutting wheel itself.

Another prior-art stump grinding apparatus is sold by Levco, of Wynne, Ark. The Levco machine is of the walk-behind variety, which locates the operator farther from the grinding operation and permits the operator to stand erect and manipulate the grinder with a handlebar and the wheels of the grinder. A similar device is sold under the brand name "Promark." Because they employ heavy large-displacement, four-stroke engines, both the Levco and Promark devices are extremely heavy and bulky, and generally must be transported to and from the worksite using a pickup truck or trailer.

A need exists, therefore, for an improved stump-grinding apparatus that is light in weight, easily transported, and safe and efficient to operate.

SUMMARY OF THE INVENTION

It is a general object of the present invention to provide an improved stump-grinding apparatus.

This and other objects of the present invention are accomplished by providing a stump-grinding apparatus including a prime mover secured to a frame having a pair of wheels and a handle. A cutting wheel is secured to the prime mover for rotation. At least one cam member is coupled between the wheels and the frame and is operable from the handle to selectively adjust the height between the cutting wheel and the object to be disintegrated. A throttle member is also secured to the handle for selective control of the prime mover.

According to a preferred embodiment of the present invention, the handle is telescopically coupled to the frame to permit the handle to be collapsed relative to the frame.

According to a preferred embodiment of the present invention, the cutting wheel has a generally disk-shaped element having an outer diameter. At least one cutting tooth having a leading cutting edge and a generally opposite trailing cutting edge is secured to the outer diameter of the disk to define a selected angle between the leading cutting edge and a line parallel to the axis rotation of the cutting wheel. This angular offset permits the cutting wheel to cut a wider kerf, and to impart a slicing action in addition to the chipping action of the teeth.

According to a preferred embodiment of the present invention, at least one cutting tooth boss having a cutting tooth mounting surface is secured to the outer diameter of the disk and the cutting tooth is secured to the cutting tooth mounting surface of the boss. The cutting tooth mounting surface may be inclined, wherein the leading cutting edge of the tooth is elevated relative to the trailing edge, and the tooth is provided with a pitch to smooth the cutting action of the cutting wheel. The disk is provided with lightening holes to reduce the mass of the cutting wheel and to dampen vibration of the cutting wheel.

Other objects, features and advantages of the present invention will become apparent to those skilled in the art with reference to the drawings and detailed description, which follow.

DESCRIPTION OF THE DRAWINGS

FIG. 5 is an edge, elevation view of a cutting wheel according to the present invention.

FIG. 6 is an elevation view of a stump grinding apparatus according to the present invention.

FIG. 9 is a fragmentary elevation view of a portion of the stump grinding apparatus of FIG. 6, the view taken along line 9—9 in FIG. 8.

FIG. 10 is a fragmentary elevation view of a portion of the stump grinding apparatus of FIG. 6, the view taken along line 10—10 in FIG. 8.

FIG. 11 is an end elevation view of a portion of the stump grinding apparatus of FIG. 6.

FIG. 12 is a fragmentary, enlarged view of the throttle assembly of the stump grinding apparatus of FIG. 6.

DESCRIPTION OF THE PREFERRED EMBODIMENT

Figure 1:
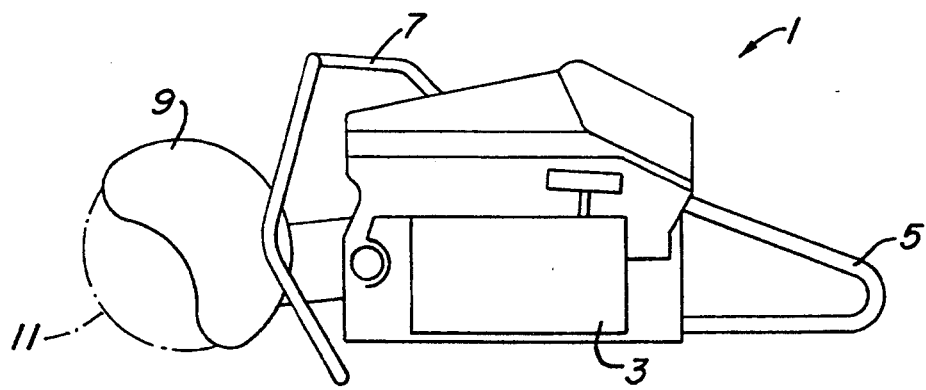
FIG. 1 is a perspective view of a hand-held stump-grinding apparatus as contemplated for use with the present invention.

Referring now to the Figures and specifically to FIG. 1, a perspective view of a hand-held stump-grinding apparatus 1 is illustrated. Stump-grinding apparatus 1 comprises a motor 3, a pair of handles 5, 7, a shaft (not shown), a protective shroud 9, and a cutting wheel 11, shown in phantom line. Cutting wheel 11 is secured to the shaft for rotation by motor 3 to disintegrate stumps (not shown). Handles 5, 7 are provided to ease manipulation of stump-grinding apparatus 1. Shroud 9 is provided to shield the user from flying chips of stump material produced during grinding of the stump. However, use of such a hand-held stump grinder may be hazardous in that the operator must kneel or stoop to manipulate the grinder, resulting in operator fatigue and increased opportunity for accidents. Moreover, requiring the operator 2b so near the cutting wheel increases the exposure to injury from flying chips or cutting wheel 11.

Figure 2:
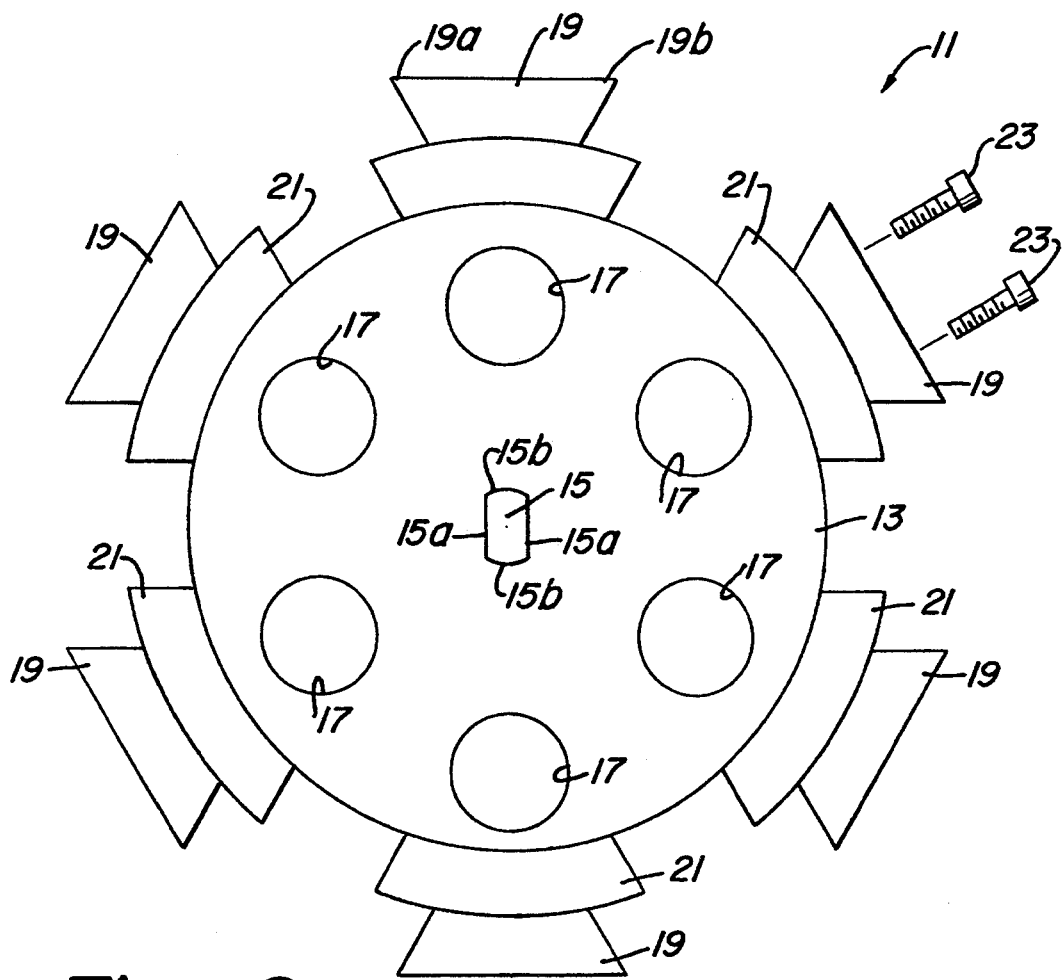
FIG. 2 is plan view of a cutting wheel according to the present invention.

FIG. 2 depicts a plan view of the cutting wheel 11 according to the present invention. Cutting wheel 11 includes a reversible disk 13. A generally noncircular hole 15 is formed through the center of reversible disk 13. According to a preferred embodiment of the present invention, generally noncircular hole 15 comprises a broached hole having a pair of opposing, parallel, generally planar surfaces 15a, which are connected by a pair of opposing, generally arcuate surfaces 15b. Generally, noncircular hole 15 is provided to secure cutting wheel 11 to a correspondingly shaped, generally noncircular shaft (not shown) of stump-grinding apparatus 1, to transfer torque and rotation from the shaft to wheel 11. Noncircular hole 15 need not be formed as illustrated, but should be formed to permit transmission of torque and rotation from the shaft and so that cutting wheel 11 may be secured to the shaft, removed from the shaft, reversed relative to the shaft, and replaced upon the shaft.

A plurality, in this case six, lightening holes 17 are circumferentially spaced through reversible disk 13 intermediate the center and the outer diameter thereof. Lightening holes are provided to reduce the mass of wheel 11, and to reduce its rigidity, wherein vibration of wheel 11 is damped in cutting operation.

At least one, in this case six, cutting tooth 19 is secured to the outer diameter of reversible disk 13. Each cutting tooth 19 is provided with a pair of generally opposite cutting edges 19a, 19b, which preferably are carbide-tipped. Each of the pair of cutting edges 19a, 19b defines a leading cutting edge and a trailing cutting edge, dependent upon the direction of rotation of cutting wheel 11. As an example, if wheel 11 is rotated in a counter-clockwise direction, cutting edge 19a is a leading cutting edge, and cutting edge 19b is a trailing cutting edge that is not arranged for cutting engagement with the stump to be ground. The converse is true if the direction of rotation of cutting wheel 11 is reversed.

Preferably, at least one, in this case six, cutting tooth boss 12 is secured between the outer diameter of disk 13 and each cutting tooth 19. In the preferred embodiment, cutting tooth bosses 21 are welded to the outer diameter of disk 13, and cutting teeth 19 are secured to bosses 21 by a pair of bolts 23. Cutting tooth bosses 21 increase the protrusion of teeth 19 from disk, and provide a wider, heavier section to drill and tap to receive bolts 23. Those skilled in the art will appreciate that lightening holes 17, cutting teeth 19, and cutting tooth bosses 21 must be located on disk 13 with care to insure that cutting wheel is balanced for smooth rotation in operation.

Figure 3:
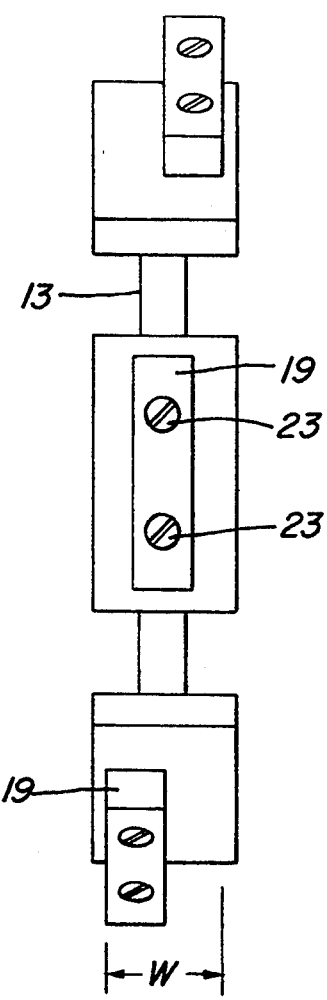
FIG. 3 is an edge, elevation view of the cutting wheel of FIG. 2.

FIG. 3 depicts an edge elevation view of cutting wheel 11 of FIG. 2. The offset of cutting teeth 19 and cutting tooth bosses 21 is illustrated. A first cutting tooth 19 and cutting tooth boss 1 is aligned with a central plane of disk 13. A second and adjacent cutting tooth 19 and cutting tooth boss 21 is offset relative to the first by alignment to one side of the central plane normal to the axis of rotation of disk 13. A third and adjacent cutting tooth 19 and cutting tooth boss 21 is laterally offset relative to the first by alignment to another and opposite side of the central plane of disk 13. Thus, provision of the cutting teeth 19 and cutting tooth bosses 21 with an offset increases a width W of the kerf that is cut by cutting wheel 11. According to a preferred embodiment of the present invention, disk 13 is ⅜ inch in width and 6 inches in diameter. Cutting teeth 19 and cutting tooth bosses 21 are ⅝ and ¾ inch in width respectively, and are offset from the central plane of disk 13 an amount sufficient to define width W of 1 ¾ inch.

Figure 4:
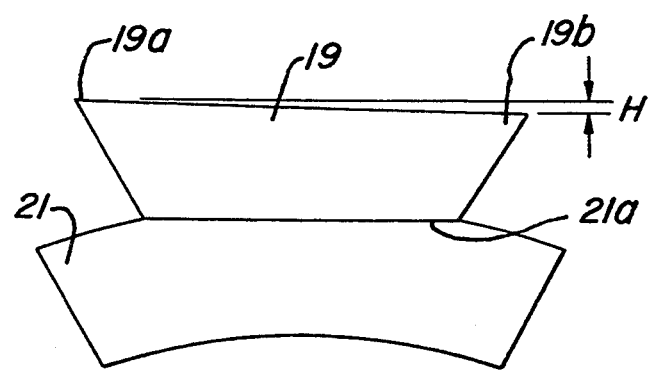
FIG. 4 is a plan view of a cutting tooth boss according to an embodiment of the cutting wheel of the present invention.

FIG. 4 illustrates cutting tooth 19 and cutting tooth boss 21 in enlarged elevation view. In the embodiment illustrated, an inclined cutting tooth mounting surface 21a is formed on an upper extent of cutting tooth boss 21. As is illustrated, upon securement of cutting tooth 19 on cutting tooth mounting surface 21a, leading cutting edge 19a is elevated an amount h relative to trailing cutting edge 19b in a counter-clockwise direction of rotation. Preferably, h is ⅛ inch. The elevation of one cutting edge relative to another provides cutting tooth 19 with a pitch, which prevents trailing cutting edge 19b from uselessly striking the stump after the leading cutting edge has cut the stump. Provision of cutting tooth 19 with a pitch permits smoother cutting operation of cutting wheel 11 according to the present invention, which results in a more easily manipulated stump-grinding apparatus that more efficiently uses cutting energy.

Those skilled in the art will appreciate that the pitch only has utility in one cutting direction of rotation of wheel 11. Pitch is retained by removal of tooth 19 from its cutting tooth boss 21, and reversal and replacement thereon, thus exposing a fresh set of cutting edges 19b.

FIG. 5 is an edge elevation view of a preferred embodiment of a cutting wheel 111 for a stump-grinding apparatus. In plan view, cutting wheel 111 appears substantially similar to cutting wheel 11 shown in FIG. 2. Each cutting tooth 119 has a leading cutting edge 119a and a trailing cutting edge 119b. Like cutting wheel 11, cutting wheel 111 includes a generally disk-shaped element 113. Six cutting teeth 119 are secured to the outer diameter of disk 113 and are configured substantially as shown in FIG. 2. Preferably, six cutting tooth bosses 121 are secured between the outer diameter of disk 113 and each cutting tooth 119. Cutting tooth bosses 121 are welded to the outer diameter of disk 113 and cutting teeth 119 are secured to bosses 121 by a pair of bolts 123.

Rather than being laterally offset, as in the case of cutting teeth 19 illustrated in FIG. 2, cutting teeth 119 are secured to cutting tooth bosses 121 at an angle $\alpha$, wherein a selected angle is defined between a line parallel to the rotational axis of cutting wheel 111 and the cutting edge of tooth 119. Selected angle α between the line parallel to the rotational axis and the cutting edge supplements the chipping action of cutting wheel 11 shown in FIG. 2 with a slicing action, which promotes the cutting efficiency of cutting wheel 111. The preferred angle α between the line parallel to the rotational axis of disk 113 and the cutting edge of tooth 119 is 3.2 degrees. This angle α is obtained by laterally offsetting mounting bolts 123, which are longitudinally spaced apart 1⅛ inch, by ⅛ inch, measured center to center.

FIG. 6 illustrates a stump-grinding apparatus 211 according to the present invention. Stump-grinding apparatus 211 includes a pair of grips 215, 217 and a throttle trigger 219 as a part of rear grip 217. Prime mover 213 is secured to a cart frame 221. A preferred prime mover 213 is a Stihl model TS-760 engine having a displacement of 111 cc that produces 6.8 horsepower. The TS-760 is a two-stroke engine that weighs only 31.5 pounds. Prime mover 213 should be selected to be lightweight, compact, and to produce sufficient horsepower to accomplish stump-grinding in an efficient manner. Two-stroke engines are preferred as the prime mover because their mechanical simplicity achieves these goals more readily than most four-stoke engines.

Cart frame 221 is preferably constructed of welded tubing and angle iron and telescopically receives an upper handle portion 223. Upper handle portion 223 is formed of bent tubing and is secured against telescopic movement within cart frame 221 by a bolt or clevis pin arrangement 225.

A pair of wheels 227 is movably secured to cart frame 221 at a lower extent thereof. A height adjustment rod bracket 241 is secured to an upper extent of upper handle portion 223. Height adjustment rod bracket 241 receives a height adjustment rod 251. Height adjustment rod 251 is coupled between upper handle portion 223 of cart frame and wheels 227 to permit selective adjustment of the relative height between the cutting wheel of stump-grinding apparatus 211 and the ground or object to be disintegrated. Height adjustment rod 251 is provided with a plurality of notches 253, which register with an aperture in height adjustment rod bracket 241.

Figure 7:
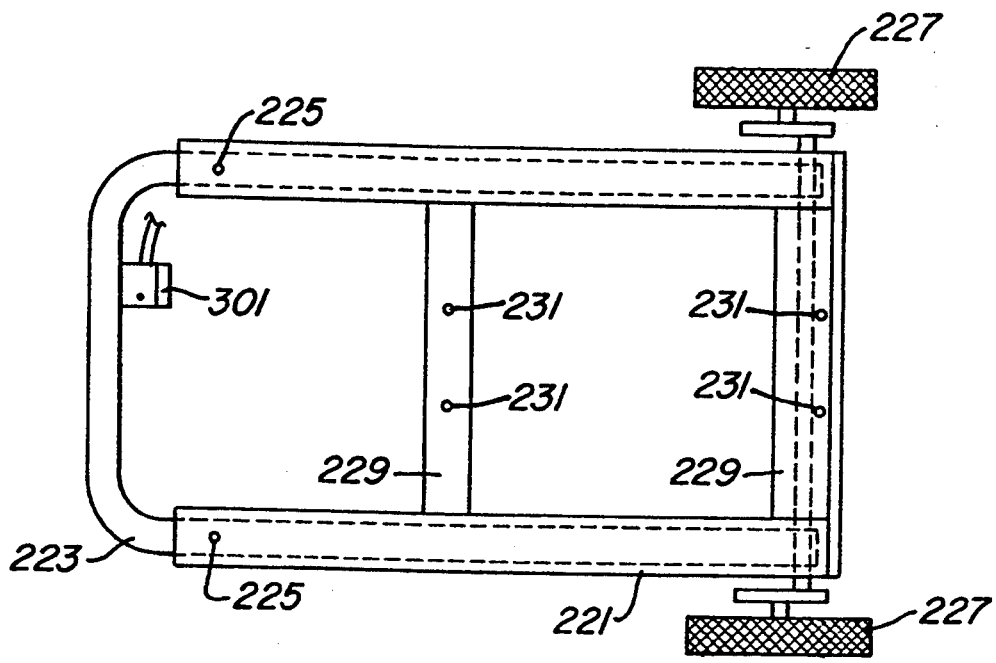
FIG. 7 is a plan view of a portion of the stump grinding apparatus of FIG. 6.

FIG. 7 depicts a plan view of the cart portion of stump grinding apparatus 211 of FIG. 6, illustrating upper handle portion 223 telescopically collapsed in cart frame 221. A pair of cross members 229 extend transversely between the frame members of cart frame 221. Each cross member 229 is provided with a pair of holes 231 for receiving a conventional J- or U-bolt to secure handles 215, 217 of prime mover 213 to the cart frame of stump grinding apparatus 211. A throttle lever 301 is secured to the transverse portion of upper handle 223. Throttle lever 301 provides the ability to control the speed of prime mover 213 from the handle of stump-grinding apparatus 211. Throttle lever 301 is conventional in construction and is similar to a conventional bicycle derailleur or brake lever.

Figure 8:
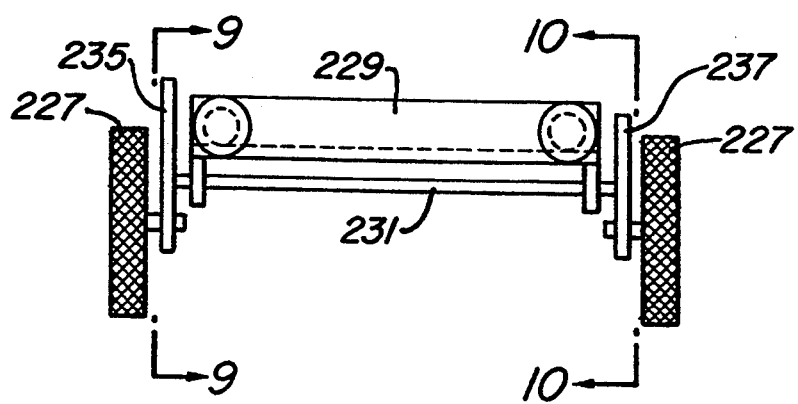
FIG. 8 is an end elevation view of the stump grinding apparatus of FIG. 6.

FIG. 8 is an end elevation view of the cart portion of stump grinding apparatus 212 illustrated in FIG. 7. An axle 231 is coupled to lower cross member 229. Each wheel 227 is coupled to axle 231 by a cam member 235, 237. Each cam member 235, 237 is rigidly secured to axle 231.

With reference to FIGS. 9 and 10, which illustrate side elevation views of cam members 235, 237 shown in FIG. 8, the cooperation of cam members 235, 237 with cross member 229 of cart frame 221, axle 231, and wheels 227 may be better understood. Cam member 235 is coupled to cross member 229 and has an upper portion conventionally coupled to height-adjustment rod 241, and a lower end conventionally coupled to wheel 227. A medial portion of cam member 235 is rigidly secured to one end of axle 231.

A second cam member 237 is rigidly secured to an opposite end of axle 231, and a second wheel 227 is mounted for rotation thereon. Thus, responsive to manipulation of height-adjustment rod 241, first cam member 235 moves wheel 227 relative to cross member 229 of cart frame 221. Because both cam members 235, 237 are rigidly secured to axle 231, second cam member 237, and wheel 227, moves relative to cart frame 221 in tandem with first cam member 235 and wheel 227. Thus, the presence of cam members 235, 237 coupled between cart frame 221 and wheels 227, permits wheels 227 to be moved relative the remainder of stump-grinding apparatus 211 to adjust the relative height between the cutting wheel and the ground or the object to be disintegrated, as illustrated in phantom line in FIG. 6.

FIG. 11 is an end elevation view of a portion of stump-grinding apparatus 211 according to the present invention. A height-adjustment rod bracket 241 is secured to upper handle portion 223. An aperture 243 including a keyway 245 is provided through height-adjustment rod bracket 241. Keyway 245 of aperture 243 registers with notches (253 in FIG. 6) in height-adjustment rod 251, to provide a means for selectively permitting movement between height-adjustment rod 251 and height-adjustment rod bracket 241. Thus, when it is desirable to manipulate height-adjustment rod 251, rod 251 is lifted within aperture 243 until notches 253 no longer engage keyway 245. Height-adjustment rod 251 then can be freely manipulated and replaced into registry with keyway 245 to resecure height-adjustment rod 251 against movement relative to height-adjustment rod bracket 241.

FIG. 12 is an enlarged elevation view of the throttle control assembly of stump-grinding apparatus 211 according to the present invention. As previously stated, rear grip 217 includes a throttle trigger 219 for selective control of prime mover 213. A throttle cable housing 303 extends from throttle lever 301 to a plate 305 that is secured to rear grip 217 by U bolt 307. The terminal end of throttle cable housing 303 is received in an aperture in plate 305. Throttle cable 309 extends from throttle cable housing 303, through plate 305, around grip 217 and trigger 219 and is secured to plate 305 on a side of grip 217 generally opposite the side of handle 217 on which throttle cable housing 303 is secured to plate 305. Thus, manipulation of throttle lever 301 from upper handle portion 223 places throttle cable 309 in tension or slack, which depresses or releases, as the case may be, throttle trigger 219 of prime mover 213.

With reference to FIGS. 2 through 12, the operation of stump-grinding apparatus 211 according to the present invention will be described. Cutting wheel 11, 111 is secured to the shaft of stump-grinding apparatus 211. The stump to be ground or disintegrated is prepared by removing debris from the area that might be thrown if engaged by rotating cutting wheel 11, 111. Prime mover 213 of stump-grinding apparatus 211 is started, which commences rotation of cutting wheel 11, 111.

Stump-grinding apparatus 211 then is manipulated into cutting engagement with the stump, wherein leading cutting edges 19a, 119a engage and disintegrate stump material. Disintegration of the stump is continued as long as desired or until cutting edges 19a, 119a display dullness. If cutting edges 19a, 119a display dullness, prime mover 213 is stopped and cutting wheel 11, 111 ceases to rotate. Transposition of cutting edges 19a, 119a, 19b, 119b may be obtained by removal and reversal of each individual cutting tooth 19, 119 relative to its cutting tooth boss 21, 121. Thus, a fresh, sharp set of cutting edges 19b, 119b is exposed and the useful life of wheel 11, 111 is effectively doubled.

During operation, the speed or revolutions per minute (rpm) of prime mover is controlled from handle 223 by throttle lever 301. Also, as the object to be disintegrated is removed, it may become advantageous to adjust the relative height between cutting wheel 11, 211 and the object. This is accomplished by manipulation of height-adjustment rod 251. Specifically, rod 251 is released from engagement with keyway 245 of bracket 241 and is pulled toward operator to raise cutting wheel 11, 111 relative to the object, or is pushed toward prime mover 213 to lower cutting wheel 11, 111 relative to the object. After the adjustment is made, rod 251 is reengaged with keyway 245 to fix rod 251, cam members 235, 237 and wheels 227 in their adjusted position.

After stump-grinding operations are complete, bolts or clevis pins 225 may be removed and handle 223 telescopically collapsed within cart member 221, wherein the spatial dimensions of stump-grinding apparatus 211 are reduced to facilitate transportation.

A principle advantage of the stump-grinding apparatus according to the present invention is that it is light in weight, easily transported, and safe and efficient to operate.

The present invention is described herein with reference to a preferred embodiment thereof. Those skilled in the art will appreciate that it is thus not limited, but is susceptible to variation and modification without departure from the scope and spirit of the invention.

I claim:

1. An apparatus for disintegration of tree stumps and the like, the apparatus comprising:
   a prime mover;
   a cutting wheel coupled to the prime mover for rotation, the cutting wheel including:
      a generally disk-shaped element having an axis of rotation;
      a plurality of cutting teeth secured to a periphery of the disk-shaped element, each cutting tooth having a leading cutting edge and a trailing cutting edge, the tooth being secured to the disk-shaped element to define a selected angle between a line parallel to the rotational axis and the cutting edge, wherein the cutting wheel is provided with a combination chipping and slicing cutting action during rotation thereof, each cutting tooth being reversible relative to the disk-shaped element, wherein the leading and trailing cutting edges are transposed to extend the operational life of the cutting wheel.

2. The apparatus according to claim 1 further comprising:
   a frame secured to the prime mover, the frame including at least one handle;
   a pair of wheels secured to the frame;
   means coupled between the pair of wheels and the frame that include a cam member, operable from the handle of the frame, for selective adjustment of a height between the cutting wheel and the object to be disintegrated.

3. The apparatus according to claim 2 further comprising a throttle member secured to the handle for selective control of the prime mover.

4. The apparatus according to claim 1 wherein the selected angle between the line parallel to the rotational axis and the cutting edge is 3.2 degrees.

5. An apparatus for disintegration of tree stumps and the like, the apparatus comprising:
   a prime mover coupled to a frame, the frame including a pair of wheels and at least one handle, the handle being coupled to the frame to permit collapsibility of the handle relative to the frame to reduce the spatial dimension of the apparatus and increase its portability;
   a cutting wheel, including a plurality of cutting teeth, coupled to the prime mover for rotation; and
   a throttle means secured to the handle of the frame for selective adjustment of the prime mover.

6. The apparatus according to claim 5 further including means coupled between the wheel and the frame, and operable from the handle, for selectively adjusting a relative height between the cutting wheel and the object to be disintegrated.

7. The apparatus according to claim 5 wherein the selected angle between the line parallel to the rotational axis and the cutting edge is 3.2 degrees.

8. An apparatus for disintegrating tree stumps and the like, the apparatus comprising:
   a frame;
   a handle telescopically coupled to the frame to permit the handle to be collapsed relative to the frame to reduce the spatial dimension of the frame;
   a prime mover coupled to the frame;
   a cutting wheel, including a plurality of cutting teeth, coupled to the prime mover for rotation;
   a pair of wheels coupled to the frame;
   a cam member coupled between the pair of wheels and operable from the handle to permit selective adjustment of a relative height between the cutting wheel and the object to be disintegrated; and
   a throttle operable from the handle of the frame to selectively control the prime mover.

9. The apparatus according to claim 8 wherein the cutting wheel further includes:
   a generally disk-shaped element having an axis of rotation, the generally disk-shaped element defining a plane substantially perpendicular to the axis of rotation;
   the plurality of cutting teeth being secured to a periphery of the disk-shaped element, each cutting tooth having a cutting edge and a trailing edge, the tooth being secured to the disk-shaped element to define a selected angle between a line parallel to the rotational axis plane and the cutting edge, wherein the cutting wheel is provided with a combination chipping and slicing cutting action during rotation thereof.

10. The apparatus according to claim 8 further including:
    a rod coupled to the cam member, the rod being provided with a plurality of adjustment notches;
    a bracket coupled to the handle and having an aperture therethrough to slidingly receive the rod, the aperture being formed to selectively engage the adjustment notches of the rod, wherein manipulation of the rod within the bracket permits the selective adjustment of the relative height between the cutting wheel and the object to be disintegrated.

* * * * *